United States Patent
Jasinkiewicz et al.

(10) Patent No.: US 8,240,133 B2
(45) Date of Patent: Aug. 14, 2012

(54) INJECTOR TIP CLEANING SYSTEMS AND METHODS

(75) Inventors: Paul Jasinkiewicz, Northville, MI (US); James M. Perrin, Livonia, MI (US)

(73) Assignee: GM Global Technology Operations LLC

( * ) Notice: Subject to any disclaimer, the term of this patent is extended or adjusted under 35 U.S.C. 154(b) by 738 days.

(21) Appl. No.: 12/415,109

(22) Filed: Mar. 31, 2009

(65) Prior Publication Data

US 2010/0250090 A1 Sep. 30, 2010

(51) Int. Cl.
*F01N 3/00* (2006.01)
*F01N 3/10* (2006.01)
*F01N 3/02* (2006.01)

(52) U.S. Cl. ............... 60/286; 60/295; 60/297; 60/303; 60/311

(58) Field of Classification Search ............ 60/274, 60/276, 286, 295, 297, 303, 311
See application file for complete search history.

(56) References Cited

U.S. PATENT DOCUMENTS

| | | | |
|---|---|---|---|
| 4,987,738 A * | 1/1991 | Lopez-Crevillen et al. | 60/286 |
| 7,441,402 B2 | 10/2008 | Suzuki et al. | |
| 7,721,702 B2 * | 5/2010 | Miller et al. | 123/298 |
| 2003/0230078 A1 | 12/2003 | Yahata et al. | |
| 2007/0028765 A1 * | 2/2007 | Gonze et al. | 95/11 |
| 2008/0295492 A1 * | 12/2008 | Karkkainen et al. | 60/286 |
| 2009/0037082 A1 * | 2/2009 | Takano et al. | 701/104 |
| 2009/0071126 A1 * | 3/2009 | Gonze et al. | 60/286 |
| 2009/0071128 A1 * | 3/2009 | Gonze et al. | 60/286 |

OTHER PUBLICATIONS

U.S. Appl. No. 12/423,292, filed Apr. 14, 2009, Perrin, James M.

* cited by examiner

*Primary Examiner* — Thomas Denion
*Assistant Examiner* — Audrey K Bradley

(57) ABSTRACT

A treatment control system comprises a monitoring module and an injection control module. The monitoring module monitors an exhaust temperature and an exhaust flow rate in an exhaust system of a vehicle. The injection control module controls injection of a dosing agent into the exhaust system for first and second regeneration events of a diesel particulate filter (DPF) and selectively injects a predetermined amount of the dosing agent into the exhaust system between the first and second regeneration events when the exhaust temperature is greater than a predetermined temperature and the exhaust flow rate is greater than a predetermined flow rate.

15 Claims, 3 Drawing Sheets

INJECTOR TIP CLEANING SYSTEMS AND METHODS

FIELD

The present disclosure relates to internal combustion engines and more particularly to injectors associated with exhaust systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air/fuel mixture to generate torque and propel a vehicle. Combustion of the air/fuel mixture produces exhaust that is expelled from an engine to an exhaust system. Exhaust systems include a treatment system that treats the exhaust before the exhaust is expelled from the exhaust system.

Some exhaust systems include one or more injectors that inject a fluid into the exhaust system. For example, exhaust systems having a diesel oxidation catalyst (DOC) may include a hydrocarbon (HC) injector that injects a HC fluid (e.g., fuel) upstream of the DOC. Once the DOC reaches a predetermined temperature, injected HC may be combusted by the DOC. Exhaust systems having a selective catalytic reduction (SCR) catalyst generally include a dosing agent injector that injects a dosing fluid (e.g., urea) upstream of the SCR catalyst. The SCR catalyst selectively absorbs the dosing fluid and reduces nitrogen oxides (NOx) passing the SCR catalyst.

SUMMARY

A treatment control system comprises a monitoring module and an injection control module. The monitoring module monitors an exhaust temperature and an exhaust flow rate in an exhaust system of a vehicle. The injection control module controls injection of a dosing agent into the exhaust system for first and second regeneration events of a diesel particulate filter (DPF) and selectively injects a predetermined amount of the dosing agent into the exhaust system between the first and second regeneration events when the exhaust temperature is greater than a predetermined temperature and the exhaust flow rate is greater than a predetermined flow rate.

In other features, the treatment control system further comprises a regeneration determination module and a regeneration control module. The regeneration determination module determines a regeneration progress value for the second regeneration event. The regeneration control module initiates the second regeneration event when the regeneration progress value is greater than a first predetermined value.

In still other features, the injector control module injects the dosing agent between the first and second regeneration events when the regeneration progress value is greater than a second predetermined value that is less than the first predetermined value.

In further features, the injector control module determines the predetermined amount based on the second predetermined value.

In still further features, the injector control module selectively injects the dosing agent between the first and second regeneration events when a second exhaust temperature is less than a second predetermined temperature that is greater than the predetermined temperature.

In other features, the injector control module selectively injects the dosing agent between the first and second regeneration events when the exhaust flow rate is less than a second predetermined flow rate that is greater than the predetermined flow rate.

In still other features, the injector control module injects the dosing agent between the first and second regeneration events when a period measured from a last injection of the dosing agent is greater than a predetermined period.

In further features, the injector control module injects the dosing agent between the first and second regeneration events when the period is greater than the predetermined period while at least one of the exhaust temperature is less than the predetermined temperature and the exhaust flow rate is less than the predetermined flow rate.

In still further features, a counter value is incremented when the dosing agent is injected between the first and second regeneration events. The injector control module prevents a second injection of the dosing agent before the second regeneration event and after the counter value is incremented when the counter value is greater than a predetermined value.

A treatment control system comprises a monitoring module and an injection control module. The monitoring module monitors an exhaust temperature and an exhaust flow rate in an exhaust system of a vehicle. The injection control module controls injection of a fluid into the exhaust system at first and second times when first and second predetermined exhaust system conditions occur, respectively, and selectively injects a predetermined amount of the fluid into the exhaust system between the first and second times when the exhaust temperature is greater than a predetermined temperature and the exhaust flow rate is greater than a predetermined flow rate.

In other features, the fluid is a dosing agent.

A treatment control method comprises: monitoring an exhaust temperature and an exhaust flow rate in an exhaust system of a vehicle; controlling injection of a dosing agent into the exhaust system for first and second regeneration events of a diesel particulate filter (DPF); and selectively injecting a predetermined amount of the dosing agent into the exhaust system between the first and second regeneration events when the exhaust temperature is greater than a predetermined temperature and the exhaust flow rate is greater than a predetermined flow rate.

In other features, the treatment control method further comprises determining a regeneration progress value for the second regeneration event and initiating the second regeneration event when the regeneration progress value is greater than a first predetermined value.

In still other features, the treatment control method further comprises selectively injecting the dosing agent when the regeneration progress value is greater than a second predetermined value that is less than the first predetermined value.

In further features, the treatment control method further comprises determining the predetermined amount based on the second predetermined value.

In still further features, the treatment control method further comprises limiting the selectively injecting to when a second exhaust temperature is less than a second predetermined temperature that is greater than the predetermined temperature.

In other features, the treatment control method further comprises limiting the selectively injecting to when the exhaust flow rate is less than a second predetermined flow rate that is greater than the predetermined flow rate.

In still other features, the treatment control method further comprises limiting the selectively injecting to when a period measured from a last injection of the dosing agent is greater than a predetermined period.

In further features, the treatment control method further comprises limiting the selectively injecting to when the period is greater than the predetermined period while at least one of the exhaust temperature is less than the predetermined temperature and the exhaust flow rate is less than the predetermined flow rate.

In still further features, the treatment control method further comprises incrementing a counter value when the dosing agent is injected between the first and second regeneration events and preventing a second injection of the dosing agent before the second regeneration event and after the counter value is incremented when the counter value is greater than a predetermined value.

A treatment control method comprises: monitoring an exhaust temperature and an exhaust flow rate in an exhaust system of a vehicle; controlling injection of a fluid into the exhaust system at first and second times when first and second predetermined exhaust system conditions occur, respectively; and selectively injecting a predetermined amount of the fluid into the exhaust system between the first and second times when the exhaust temperature is greater than a predetermined temperature and the exhaust flow rate is greater than a predetermined flow rate.

In other features, the fluid is a dosing agent.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
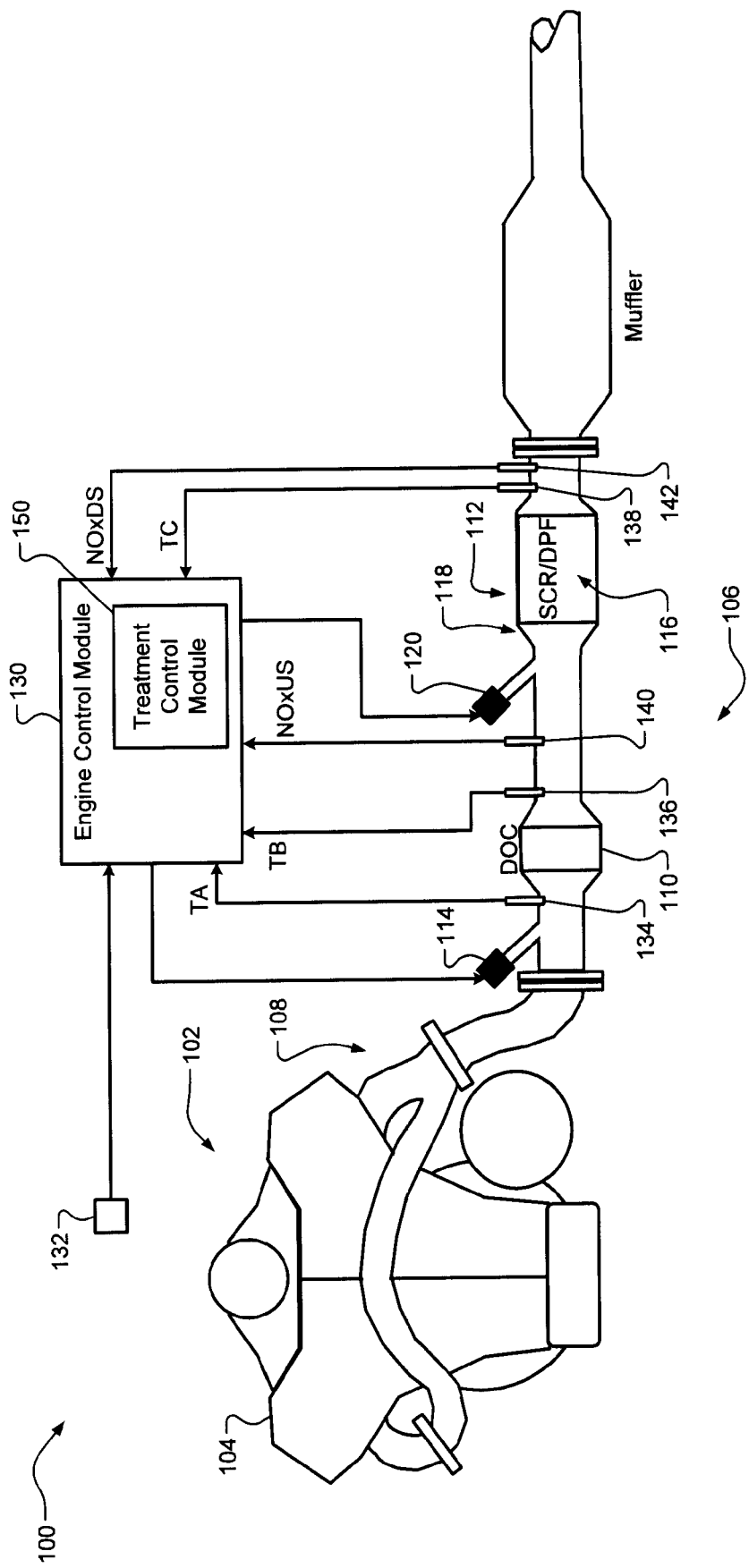
FIG. 1 is a functional block diagram of an exemplary vehicle system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an application specific integrated circuit (ASIC), an electronic circuit, a processor (shared, dedicated, or group) and memory that executes one or more software or firmware programs, a combinational logic circuit, and/or other suitable hardware components that provide the described functionality.

An exhaust system includes an injector that injects fluid into the exhaust system. For example only, the injector may inject a dosing agent (e.g., urea) or a hydrocarbon (HC) fluid (e.g., fuel) into the exhaust system. A controller controls injection of fluid. More specifically, the controller injects fluid into the exhaust system when predetermined events or conditions occur. For example only, the controller controls injection of HC into the exhaust system for regeneration events of a diesel particulate filter (DPF).

The injector, however, may become plugged or clogged over time, due to particulate and/or debris within the exhaust system. The controller of the present disclosure selectively injects fluid into the exhaust to prevent plugging of the injector. With respect to HC injection, for example, the controller injects a predetermined amount of HC between regeneration events when an exhaust temperature is greater than a predetermined temperature and an exhaust flow rate is greater than a predetermined flow rate. The controller also injects a predetermined amount of the fluid when a predetermined period passes after a last injection of the fluid. In this manner, the controller injects the fluid into the exhaust system when the fluid would not otherwise be injected to prevent plugging.

Referring now to FIG. 1, a functional block diagram of an exemplary vehicle system 100 is presented. The vehicle system 100 includes a diesel engine system 102. The diesel engine system 102 is described and shown for purposes of illustration only. The present disclosure is also applicable to other types of engine systems, such as gasoline engine systems, homogenous charge compression ignition engine systems, and/or hybrid engine systems.

The diesel engine system 102 includes an engine 104 that combusts a mixture of air and diesel fuel to produce torque. Exhaust resulting from combustion of the air/fuel mixture is expelled from the engine 104 to an exhaust system 106. The exhaust system 106 includes an exhaust manifold 108, a diesel oxidation catalyst (DOC) 110, and a diesel particulate filter (DPF) assembly 112. The exhaust system 106 may also include an exhaust gas recirculation (EGR) system (not shown) that recirculates a portion of the exhaust back to the engine 104.

The exhaust flows from the engine 104 through the exhaust manifold 108 to the DOC 110. The DOC 110 oxidizes particulate in the exhaust as the exhaust flows through the DOC 110. For example only, the DOC 110 may oxidize particulate, such as hydrocarbons and/or carbon oxides of the exhaust.

The exhaust system 106 may also include a hydrocarbon (HC) injector 114 that is located upstream of the DOC 110. The HC injector 114 injects a HC fluid (e.g., fuel) into the exhaust system 106. Once the DOC 110 reaches a threshold temperature (e.g., 250.0° C.), injected HC combusts and produces heat.

The DPF assembly 112 includes a DPF element 116 that filters particulate from the exhaust and traps particulate within the DPF assembly 112. Particulate accumulates within the DPF assembly 112 over time. Particulate accumulating within the DPF assembly 112 restricts the exhaust flow through the DPF element 116 and the DPF assembly 112. Accumulated particulate may be removed from the DPF assembly 112 by a process referred to as regeneration.

Regeneration may be accomplished by, for example, heat generated by combustion of injected HC. In some engine systems, a heater and/or another device (not shown) may also be implemented to provide heat near an inlet 118 of the DPF assembly 112. Combustion of particulate near the inlet 118 generates heat, which is carried downstream by the exhaust and causes further particulate combustion. In this manner, combustion beginning near the inlet 118 cascades and burns particulate trapped throughout the DPF assembly 112.

A selective catalytic reduction (SCR) catalyst (not shown) may be applied to all of or a portion of the DPF element 116. The SCR catalyst absorbs a dosing agent (e.g., urea) injected by a dosing agent injector 120. The SCR catalyst reacts with nitrogen oxides ($NO_x$) and/or other components in the exhaust. In this manner, the SCR catalyst may reduce the amount of $NO_x$ emitted from the exhaust system 106.

The SCR catalyst may be effective in reducing (reacting with) $NO_x$ once the temperature of the SCR catalyst reaches approximately 200.0° C. If the reductant is injected when the SCR temperature is less than this pressure, the dosing agent may compromise the function of the SCR catalyst or be expelled (i.e., slip) from the exhaust system 106. Heating the SCR temperature above approximately 750.0° C. may likewise compromise the function of the SCR catalyst and/or reduce the SCR catalyst's effectiveness in reacting with NOx.

An engine control module (ECM) 130 controls torque output by the engine 104. The ECM 130 may control the torque output based on, for example, parameters measured by sensors 132. The sensors 132 may include, for example, a mass airflow (MAF) sensor, an intake air temperature (IAT) sensor, an engine coolant temperature sensor, an oil temperature sensor, a manifold absolute pressure sensor (MAP), and/or other sensors.

The ECM 130 may also adjust one or more engine parameters based on parameters measured by one or more sensors associated with the exhaust system 106. The sensors associated with the exhaust system 106 may include, for example, temperature sensors, oxygen sensors, NOx sensors, $NH_3$ sensors, exhaust flow rate (EFR) sensors, and/or other sensors.

For example only, the ECM 130 may receive exhaust system temperatures from first, second and third exhaust temperature sensors 134, 136, and 138, respectively. The ECM 130 may also receive NOx measurements from NOx sensors 140 and 142. The first exhaust temperature sensor 134 measures temperature of the exhaust upstream of the DOC 110 and outputs a signal (TA) accordingly. The second exhaust temperature sensor 136 measures temperature of the exhaust downstream of the DOC 110 and outputs a signal (TB) accordingly. The third exhaust temperature sensor 138 measures temperature of the exhaust upstream of the DPF assembly 112 and outputs a signal (TC) accordingly. The NOx sensors 140 and 142 measure NOx upstream (NOxUS) and downstream (NOxDS) of the SCR catalyst, respectively.

The ECM 130 controls torque output by the engine 104. For example, the ECM 130 may adjust throttle opening, the amount of fuel supplied to the engine 104, and/or the timing of fuel injection to adjust the torque output of the engine 104. The ECM 130 may also adjust one or more parameters to provide desired exhaust conditions within the exhaust system 106.

The ECM 130 includes a treatment control module 150 that controls injection of one or more fluids into the exhaust system 106, such as HC, dosing agent, and/or other fluids. The treatment control module 150 controls injection based on predetermined events or conditions. More specifically, the treatment control module 150 injects the fluid each time when the predetermined events or conditions occur. For example only, HC may be injected for regeneration events of the DPF element 116.

The treatment control module 150 of the present disclosure selectively injects fluid between the predetermined events, when the fluid would not otherwise be injected. Injecting the fluid between the predetermined events may prevent the associated injector from becoming plugged. While the treatment control module 150 is shown as being located within the ECM 130, the treatment control module 150 may be external to the ECM 130.

Figure 2:
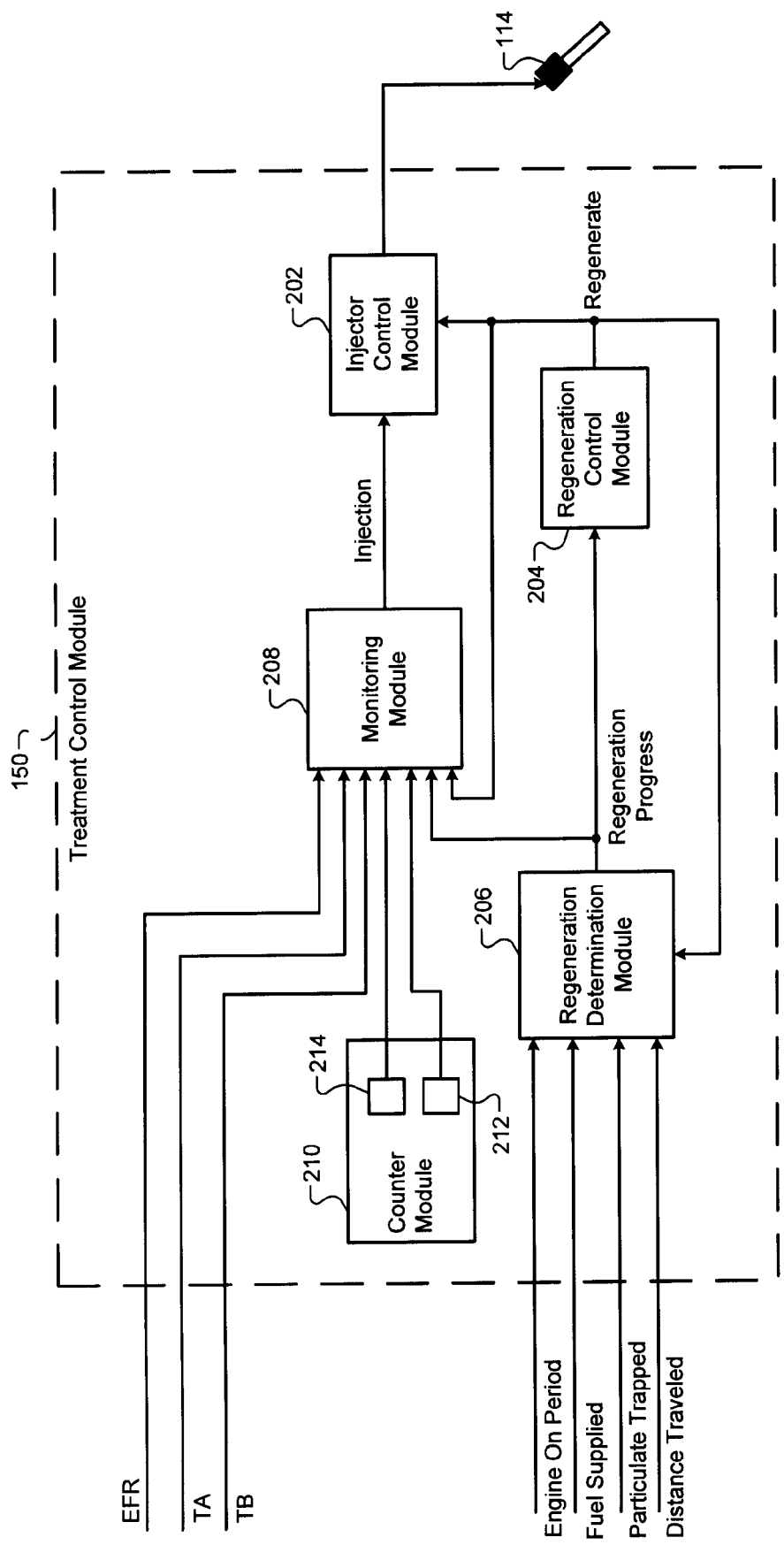
FIG. 2 is a functional block diagram of an exemplary treatment control module according to the principles of the present disclosure.

Referring now to FIG. 2, a functional block diagram of an exemplary implementation of the treatment control module 150 is presented. The treatment control module 150 may include an injector control module 202, a regeneration control module 204, and a regeneration determination module 206. The treatment control module 150 may also include a monitoring module 208 and a counter module 210.

The injector control module 202 controls the amount and timing of fluid injected into the exhaust system 106 by an associated injector. For example only, the injector control module 202 controls the amount and timing of of HC injected by the HC injector 114.

The injector control module 202 controls the amount of HC injected and timing of HC injection each time when a predetermined event occurs. For example only, the injector control module 202 injects HC into the exhaust system 106 during regeneration events and/or to initiate regeneration events of the DPF element 116.

The injector control module 202 may control the amount of fluid injected by controlling the mass flow rate of HC injection and the period during which HC is injected. The injector control module 202 may control the mass flow rate of HC injection by controlling, for example, the duty cycle of power applied to the HC injector 114.

The regeneration control module 204 selectively instructs the injector control module 202 to inject HC for a regeneration event of the DPF element 116 based on a regeneration progress value. The regeneration determination module 206 sets the regeneration progress value to a predetermined reset value (e.g., 0.0) each time when the DPF element 116 is regenerated.

The regeneration determination module 206 determines the regeneration progress value based on various parameters. For example only, the regeneration determination module 206 may determine the regeneration progress based on a period that the engine 104 has operated, an amount of fuel that has been supplied to the engine 104, and a distance travelled. The engine operation period, the amount of fuel supplied, and the distance travelled are measured from a time that the DPF element 116 was last regenerated. The regeneration progress value increases as the engine operation period, the amount of fuel supplied, and/or the distance travelled increases.

The regeneration determination module 206 may also determine the regeneration progress value based on an amount of particulate trapped within the DPF assembly 112. The regeneration progress value also increases as the amount of particulate trapped increases. The regeneration progress value may be expressed as, for example, a percentage. The magnitude of the regeneration progress value may correspond to relative progress toward a predetermined percentage or value (e.g., 100.0%) that corresponds to a next regeneration event.

The regeneration control module 204 receives the regeneration progress value and outputs a regenerate signal to command HC injection for a regeneration event of the DPF element 116. The regeneration control module 204 outputs the regenerate signal when the regeneration progress value is greater than a predetermined value, such as 100.0. In this manner, the regeneration control module 204 initiates regeneration of the DPF element 116 when the regeneration progress value reaches the predetermined percentage or value that corresponds to the next regeneration event.

The injector control module 202 injects HC into the exhaust system 106 when the regeneration control module 204 outputs the regenerate signal. In this manner, the injector control module 202 injects HC into the exhaust system 106 for regeneration events of the DPF element 116.

The injector control module 202 according to the present disclosure also selectively injects HC into the exhaust system 106 between regeneration events. In this manner, the injector control module 202 selectively injects HC at times when HC would not otherwise be injected. Injecting HC between regeneration events may aid in preventing the HC injector 114 from becoming plugged or clogged by, for example, debris, particulate, and/or other elements of the exhaust.

The injector control module 202 selectively injects HC into the exhaust system 106 between regeneration events when the monitoring module 208 outputs an injection signal. The monitoring module 208 selectively outputs the injection signal based on exhaust flow rate (EFR) and one or more exhaust temperatures. The monitoring module 208 also selectively outputs the injection signal based on a number of HC injections after a last regeneration event, the regeneration progress value, and/or whether the DPF element 116 is being regenerated. The monitoring module 208 also outputs the injection signal based on a period elapsed after a last HC injection.

For example only, the monitoring module 208 may selectively output the injection signal when the EFR is greater than a predetermined flow rate. The predetermined flow rate may be calibratable and may be set based on, for example, an engine idling EFR. For example only, the predetermined flow rate may be approximately 70.0 kg/hour. The EFR may be provided by an EFR sensor and/or a module or system that determines the EFR. For example only, the EFR may be determined based on mass air flow rate (MAF) into the engine 104.

The monitoring module 208 may also ensure that the EFR is less than a predetermined maximum flow rate before outputting the injection signal. In other words, the monitoring module 208 may selectively output the injection signal when the EFR is within a predetermined range of flow rates. The predetermined maximum flow rate may be calibratable and may be set based on, for example, a maximum possible EFR for the exhaust system 106.

The monitoring module 208 also selectively outputs the injection signal based on one or more exhaust temperatures. For example only, the monitoring module 208 selectively outputs the injection signal when the exhaust temperature upstream of the DOC 110 (i.e., TA) is greater than a predetermined temperature. The predetermined temperature may be calibratable and may be set, for example, based on a minimum combustion temperature for injected HC. For example only, the predetermined temperature may be approximately 250.0° C.

The monitoring module 208 may also ensure that an exhaust temperature is less than a predetermined maximum temperature before outputting the injection signal. The predetermined maximum temperature may be calibratable and may be set based on, for example, a temperature above which one or more components may be damaged. For example only, the predetermined maximum temperature may be approximately 750.0° C. In various implementations, the monitoring module 208 may ensure that the exhaust temperature downstream of the DOC 110 (i.e., TB) is less than the maximum predetermined temperature before outputting the injection signal. In other implementations, the monitoring module 208 may selectively output the injection signal when an exhaust temperature (e.g., TA) is within a predetermined range of temperatures.

The monitoring module 208 also selectively outputs the injection signal based on a number of HC injections after a last regeneration event. More specifically, the monitoring module 208 selectively outputs the injection signal when HC has been injected on less than a predetermined number of instances after the last regeneration event. The predetermined number may be calibratable and may be set based on, for example, a number above which HC may be expelled (i.e., slip) from the exhaust system 106 and/or one or more modeled exhaust system parameters may be affected.

A counter 212 of the counter module 210 tracks the number of HC injections after the last regeneration event. The counter 212 may be implemented in, for example, memory. The counter 212 is reset to a predetermined reset value (e.g., 0.0) each time that the DPF element 116 is regenerated. For example only, the counter 212 may be reset when the regenerate signal is output by the regeneration control module 204.

The monitoring module 208 also selectively outputs the injection signal based on the regeneration progress value. More specifically, the monitoring module 208 selectively outputs the injection signal when the regeneration progress value exceeds predetermined values. The predetermined values may be calibratable and may be set to, for example, approximately 30.0, 60.0, and 90.0. In other words, the monitoring module 208 selectively outputs the injection signal when regeneration progress value reaches 30.0%, 60.0%, and 90.0% toward the next regeneration event. The monitoring module 208 may also ensure that HC is injected once each time that the regeneration progress value exceeds one of the predetermined values.

The monitoring module 208 also selectively outputs the injection signal based on whether the DPF element 116 is being regenerated. More specifically, the monitoring module 208 selectively outputs the injection signal when the DPF element 116 is not undergoing regeneration. In other implementations, the monitoring module 208 may also ensure that the vehicle speed and the engine speed are greater than predetermined speeds before outputting the injection signal. These predetermined speeds may be calibratable and may be set to, for example, approximately 0.0 mile per hour (mph) and 400 revolutions per minute (rpm), respectively.

From the above, the monitoring module 208 may output the injection signal using the following relationship. For example only, output the injection signal when:
  EFR within the predetermined range of flow rates;
  TA is greater than the predetermined temperature;
  TB is less than the predetermined maximum temperature;
  the number of HC injections after the last regeneration event is less than the predetermined number;
  the regeneration progress value is greater than a predetermined value; and
  the DPF element 116 is not undergoing regeneration.
Injecting HC when these conditions are satisfied may aid in preventing the HC injector 114 from becoming clogged.

The monitoring module 208 also outputs the injection signal based on a period elapsed after a last HC injection. More specifically, the monitoring module 208 outputs the injection signal when the period is greater than a predetermined period. The predetermined period may be calibratable and may be set to, for example, approximately 5.0 minutes. The monitoring module 208 may output the injection signal when the period is greater than the predetermined period, regardless of whether the conditions above are satisfied.

A timer 214 tracks the period elapsed after the last HC injection. The timer 214 may be implemented in the counter module 210, for example, in memory. The timer 214 is reset to a predetermined reset value (e.g., 0.0) each time when HC is injected into the exhaust system 106. For example only, the timer 214 may be reset when the monitoring module 208 outputs the injection signal.

The injector control module 202 injects a predetermined amount of HC into the exhaust system 106 when the injection signal is output. For example only, the injector control module 202 may inject approximately 3.0 mg per second of HC for a period of approximately 3.0 seconds. The predetermined amount of HC injected may be variable based on the regeneration value. For example only, the injector control module 202 may inject a greater amount of HC at greater regeneration progress values. Injecting the greater amount of HC at larger regeneration progress values may ensure that the HC injector 114 may freely inject HC before the next regeneration event begins.

While the injector control module 202 has been discussed as controlling HC injected by the HC injector 114 between regeneration events, the present disclosure is applicable to other injectors and fluids. In other words, the present disclosure is also applicable to injecting another fluid into the exhaust system 106 between events when the associated injector generally injects the fluid.

For example only, the present disclosure is also applicable to the dosing agent injector 120 and/or another injector associated with the exhaust system 106. The dosing agent injector 120 is controlled to inject the dosing agent when predetermined conditions are satisfied relating to the upstream and downstream NOx measurements, one or more exhaust temperatures, and/or $NH_3$ slip. For example only, the dosing agent may be injected when $NH_3$ slip is not occurring and the temperature upstream of the DPF assembly 112 is within a predetermined range of temperatures. According to the present disclosure, the dosing agent may also be injected when the monitoring module 208 outputs the injection signal.

Figure 3:
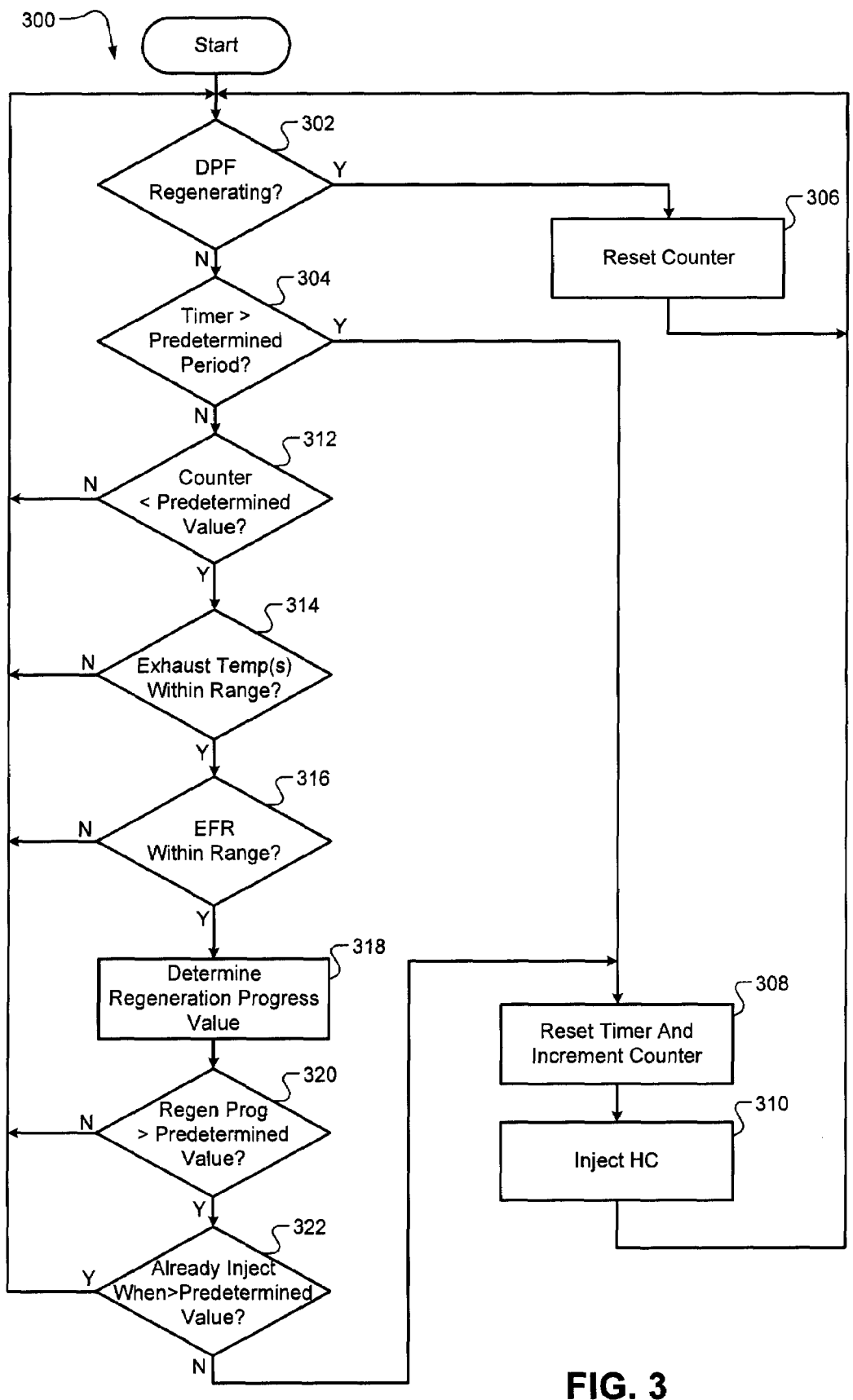
FIG. 3 is a flowchart depicting an exemplary method according to the principles of the present disclosure.

Referring now to FIG. 3, a flowchart depicting exemplary steps performed by a method 300 is presented. The method 300 begins in step 302 where the method 300 determines whether the DPF element 116 is being regenerated. In other words, the method 300 determines whether a regeneration event is occurring in step 302. If false, the method 300 continues to step 304. If true, the method 300 transfers to step 306. In step 306, the method 300 resets the counter value and returns to step 302. The counter value tracks a number of HC injections after a last regeneration event.

The method 300 determines whether the timer value is greater than the predetermined period in step 304. If true, the method 300 transfers to step 308. If false, the method 300 continues to step 312, which is discussed further below. The timer value tracks the period elapsed after a last HC injection. The method 300 resets the timer value in step 308 and increments the counter value. The method 300 injects HC in step 310 and returns to step 302. In this manner, the method 300 resets the timer value each time that HC is injected and increments the counter value each time that HC is injected between regeneration events.

Referring again to step 312, the method 300 determines whether the counter value is less than the predetermined value. In other words, the method 300 determines whether HC has been injected less than a predetermined number of times after the last regeneration event in step 312. If true, control continues to step 314. If false, the method 300 returns to step 302.

The method 300 determines whether an exhaust temperature is within the predetermined range of temperatures in step 314. In other implementations, such as in the case of HC injection, the method 300 may determine whether the TA is greater than the predetermined temperature (e.g., 250.0° C.) and the TB is less than the predetermined maximum temperature (e.g., 750.0° C.) in step 314. If true, the method 300 continues to step 316. If false, the method 300 returns to step 302.

The method 300 determines whether the EFR is within the predetermined range of flow rates in step 316. In other implementations, the method 300 determines whether the EFR is greater than a predetermined exhaust flow rate in step 316. If true, the method 300 continues to step 318. If false, the method 300 returns to step 302.

The method 300 determines the regeneration progress value in step 318. The regeneration progress value may be provided to the method 300 by a system or module or the method 300 may determine the regeneration progress value. In step 320, the method 300 determines whether the regeneration progress value is greater than a predetermined value. If true, the method 300 continues to step 322. If false, the method 300 returns to step 302.

The method 300 determines whether HC has already been injected once for the regeneration progress value exceeding the predetermined value in step 322. If true, the method 300 returns to step 302. If false, the method 300 continues to step 308 as discussed above. In this manner, the method 300 injects HC into the exhaust when the conditions of the relationship above are satisfied.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A treatment control system comprising:
a monitoring module that monitors an exhaust temperature and an exhaust flow rate in an exhaust system of a vehicle; and
an injector control module that controls injection of a dosing agent into said exhaust system for first and second regeneration events of a diesel particulate filter (DPF) and that selectively injects a predetermined amount of said dosing agent into said exhaust system between said first and second regeneration events when said exhaust temperature is greater than a predetermined temperature, said exhaust flow rate is greater than a predetermined flow rate, and a period measured from a last injection of said dosing agent is greater than a predetermined period.

2. The treatment control system of claim 1 wherein said injector control module selectively injects said dosing agent between said first and second regeneration events when a second exhaust temperature is less than a second predetermined temperature that is greater than said predetermined temperature.

3. The treatment control system of claim 1 wherein said injector control module selectively injects said dosing agent between said first and second regeneration events when said exhaust flow rate is less than a second predetermined flow rate that is greater than said predetermined flow rate.

4. The treatment control system of claim 1 wherein said injector control module injects said dosing agent between said first and second regeneration events when said period is greater than said predetermined period while at least one of said exhaust temperature is less than said predetermined temperature and said exhaust flow rate is less than said predetermined flow rate.

5. The treatment control system of claim 1 further comprising a counter value that is incremented when said dosing agent is injected between said first and second regeneration events,
wherein said injector control module prevents a second injection of said dosing agent before said second regeneration event and after said counter value is incremented when said counter value is greater than a predetermined value.

6. The treatment control system of claim 1 further comprising:
a regeneration determination module that determines a regeneration progress value for said second regeneration event; and
a regeneration control module that initiates said second regeneration event when said regeneration progress value is greater than a first predetermined value.

7. The treatment control system of claim 6 wherein said injector control module injects said dosing agent between said first and second regeneration events when said regeneration progress value is greater than a second predetermined value that is less than said first predetermined value.

8. The treatment control system of claim 7 wherein said injector control module determines said predetermined amount based on said second predetermined value.

9. A treatment control method comprising:
monitoring an exhaust temperature and an exhaust flow rate in an exhaust system of a vehicle;
controlling injection of a dosing agent into said exhaust system for first and second regeneration events of a diesel particulate filter (DPF);
selectively injecting a predetermined amount of said dosing agent into said exhaust system between said first and second regeneration events when said exhaust temperature is greater than a predetermined temperature and said exhaust flow rate is greater than a predetermined flow rate;
determining a regeneration progress value for said second regeneration event;
initiating said second regeneration event when said regeneration progress value is greater than a first predetermined value; and
selectively injecting said dosing agent when said regeneration progress value is greater than a second predetermined value that is less than said first predetermined value.

10. The treatment control method of claim 9 determining said predetermined amount based on said second predetermined value.

11. The treatment control method of claim 9 further comprising limiting said selectively injecting to when a second exhaust temperature is less than a second predetermined temperature that is greater than said predetermined temperature.

12. The treatment control method of claim 9 further comprising limiting said selectively injecting to when said exhaust flow rate is less than a second predetermined flow rate that is greater than said predetermined flow rate.

13. A treatment control method comprising:
monitoring an exhaust temperature and an exhaust flow rate in an exhaust system of a vehicle;
controlling injection of a dosing agent into said exhaust system for first and second regeneration events of a diesel particulate filter (DPF); and
selectively injecting a predetermined amount of said dosing agent into said exhaust system between said first and second regeneration events when said exhaust temperature is greater than a predetermined temperature, said exhaust flow rate is greater than a predetermined flow rate, and a period measured from a last injection of said dosing agent is greater than a predetermined period.

14. The treatment control method of claim 13 further comprising limiting said selectively injecting to when said period is greater than said predetermined period while at least one of said exhaust temperature is less than said predetermined temperature and said exhaust flow rate is less than said predetermined flow rate.

15. A treatment control method comprising:
monitoring an exhaust temperature and an exhaust flow rate in an exhaust system of a vehicle;
controlling injection of a dosing agent into said exhaust system for first and second regeneration events of a diesel particulate filter (DPF);
selectively injecting a predetermined amount of said dosing agent into said exhaust system between said first and second regeneration events when said exhaust temperature is greater than a predetermined temperature and said exhaust flow rate is greater than a predetermined flow rate;
incrementing a counter value when said dosing agent is injected between said first and second regeneration events; and
preventing a second injection of said dosing agent before said second regeneration event and after said counter value is incremented when said counter value is greater than a predetermined value.

* * * * *